(12) United States Patent
Wolcott et al.

(10) Patent No.: US 10,880,226 B2
(45) Date of Patent: *Dec. 29, 2020

(54) SCHEDULED TRANSMISSION OF DATA (71) Applicant: Comcast Cable Communications, LLC, Philadelphia, PA (US)

(72) Inventors: Larry Wolcott, Denver, CO (US); Kevin Johns, Centennial, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/249,022

(22) Filed: Jan. 16, 2019

(65) Prior Publication Data

US 2019/0386927 A1   Dec. 19, 2019

Related U.S. Application Data

(63) Continuation of application No. 14/790,216, filed on Jul. 2, 2015, now Pat. No. 10,225,203, which is a continuation of application No. 13/798,531, filed on Mar. 13, 2013, now Pat. No. 9,106,557.

(51) Int. Cl.
| | |
|---|---|
| *H04L 12/863* | (2013.01) |
| *H04L 12/801* | (2013.01) |
| *H04L 12/825* | (2013.01) |
| *H04L 12/26* | (2006.01) |

(52) U.S. Cl.
CPC ...... *H04L 47/6255* (2013.01); *H04L 43/0882* (2013.01); *H04L 47/12* (2013.01); *H04L 47/266* (2013.01)

(58) Field of Classification Search
CPC ... H04L 43/0882; H04L 47/12; H04L 47/266; H04L 47/6255; H04L 47/6275; H04L 47/10; H04L 47/628; H04L 47/50; H04L 49/90
USPC .......................................................... 370/230
See application file for complete search history.

(56) References Cited

U.S. PATENT DOCUMENTS

| | | |
|---|---|---|
| 5,361,394 A | 11/1994 | Shigihara |
| 5,687,167 A | 11/1997 | Bertin et al. |
| 5,761,191 A | 6/1998 | VanDervort et al. |
| 5,872,588 A | 2/1999 | Aras et al. |
| 5,926,476 A | 7/1999 | Ghaibeh |
| 6,028,860 A | 2/2000 | Laubach et al. |
| 6,125,105 A | 9/2000 | Edwards et al. |
| 6,148,081 A | 11/2000 | Szymanski et al. |
| 6,331,987 B1 | 12/2001 | Beser |
| 6,427,238 B1 | 7/2002 | Goodman et al. |
| 6,502,135 B1 | 12/2002 | Munger et al. |
| 6,594,246 B1 | 7/2003 | Jorgensen |
| 6,915,530 B1 | 7/2005 | Kauffman et al. |

(Continued)

*Primary Examiner* — Phong La
(74) *Attorney, Agent, or Firm* — Banner & Witcoff, Ltd.

(57) ABSTRACT

A method and system may allow for the scheduling of transmissions. A device may send a transmission request over a network where the request may be an upload request or a download request. Traffic may be monitored on the network and the traffic may determine when the transmission is to be scheduled. Depending on the traffic and the type of transmission, the transmission may be scheduled for a future time or may be added to a queue of pending transmissions. Once commenced, the transmission may be paused and resumed based on continually monitored traffic on the network.

16 Claims, 8 Drawing Sheets

(56) References Cited

U.S. PATENT DOCUMENTS

| | | |
|---|---|---|
| 6,941,574 B1 | 9/2005 | Broadwin et al. |
| 6,970,641 B1 | 11/2005 | Pierre et al. |
| 7,017,175 B2 | 3/2006 | Alao et al. |
| 7,027,461 B1 | 4/2006 | Bontempi |
| 7,055,169 B2 | 5/2006 | Delpuch et al. |
| 7,065,780 B2 | 6/2006 | Barbier et al. |
| 7,231,455 B2 | 6/2007 | Marejka et al. |
| 7,305,697 B2 | 12/2007 | Alao et al. |
| 7,362,704 B2 | 4/2008 | Sisto et al. |
| 7,426,185 B1 | 9/2008 | Musacchio et al. |
| 7,433,953 B1 | 10/2008 | Kappler et al. |
| 7,468,945 B2 | 12/2008 | Enomoto et al. |
| 7,650,379 B2 | 1/2010 | Hart et al. |
| 7,876,696 B2 | 1/2011 | Kotelba |
| 7,917,648 B2 | 3/2011 | Wu et al. |
| 8,201,205 B2 | 6/2012 | Boucher et al. |
| 8,213,301 B2 | 7/2012 | Park et al. |
| 8,396,055 B2 | 3/2013 | Patel et al. |
| 8,682,363 B1 | 3/2014 | Cardi et al. |
| 8,843,652 B2 | 9/2014 | Balasubramanian |
| 8,850,480 B2 | 9/2014 | Chane et al. |
| 9,106,557 B2 | 8/2015 | Wolcott et al. |
| 9,461,955 B1 | 10/2016 | Sherrets |
| 9,635,421 B2 | 4/2017 | Tidwell et al. |
| 2002/0006111 A1 | 1/2002 | Akita et al. |
| 2002/0126673 A1 | 9/2002 | Dagli et al. |
| 2002/0142780 A1 | 10/2002 | Airy et al. |
| 2002/0188732 A1 | 12/2002 | Buckman et al. |
| 2003/0210665 A1 | 11/2003 | Salmenkaita et al. |
| 2004/0177087 A1 | 9/2004 | Wu et al. |
| 2004/0257995 A1* | 12/2004 | Sandy ............... H04L 47/266 370/235 |
| 2005/0047783 A1 | 3/2005 | Sisto et al. |
| 2005/0076339 A1 | 4/2005 | Merril et al. |
| 2005/0094558 A1 | 5/2005 | Lu |
| 2005/0195968 A1 | 9/2005 | Park et al. |
| 2005/0281235 A1 | 12/2005 | Beach et al. |
| 2006/0053146 A1 | 3/2006 | Allhusen et al. |
| 2006/0099956 A1 | 5/2006 | Harada et al. |
| 2006/0120282 A1 | 6/2006 | Carlson et al. |
| 2006/0142040 A1 | 6/2006 | Jones |
| 2006/0184664 A1 | 8/2006 | Jung |
| 2006/0212917 A1 | 9/2006 | Boucher et al. |
| 2006/0233108 A1 | 10/2006 | Krishnan |
| 2007/0071026 A1 | 3/2007 | Rogers |
| 2007/0091176 A1 | 4/2007 | Shih et al. |
| 2007/0195789 A1* | 8/2007 | Yao ...................... H04L 47/50 370/395.21 |
| 2007/0214248 A1 | 9/2007 | Ikeda et al. |
| 2008/0075003 A1* | 3/2008 | Lee ................... H04L 47/6215 370/230 |
| 2008/0089240 A1 | 4/2008 | Toomey et al. |
| 2008/0144586 A1 | 6/2008 | Kneckt et al. |
| 2008/0191816 A1 | 8/2008 | Balachandran et al. |
| 2008/0310452 A1 | 12/2008 | Vedantham et al. |
| 2009/0067328 A1 | 3/2009 | Morris et al. |
| 2009/0086634 A1 | 4/2009 | Kwan et al. |
| 2009/0213871 A1 | 8/2009 | Carlson et al. |
| 2009/0287405 A1 | 11/2009 | Liu et al. |
| 2010/0014423 A1 | 1/2010 | Furuskar et al. |
| 2010/0085923 A1 | 4/2010 | Nyberg et al. |
| 2011/0016213 A1 | 1/2011 | Nakao |
| 2011/0122887 A1 | 5/2011 | Ma et al. |
| 2011/0134746 A1 | 6/2011 | Liu et al. |
| 2011/0161261 A1 | 6/2011 | Wu et al. |
| 2011/0194538 A1 | 8/2011 | Zheng et al. |
| 2011/0305451 A1 | 12/2011 | Nishitani et al. |
| 2011/0306351 A1 | 12/2011 | Pettersson et al. |
| 2012/0039169 A1 | 2/2012 | Susitaival et al. |
| 2012/0057478 A1 | 3/2012 | Brannstrom et al. |
| 2012/0063377 A1 | 3/2012 | Osterling et al. |
| 2012/0064908 A1* | 3/2012 | Fox .................... H04L 12/1489 455/452.2 |
| 2012/0099430 A1 | 4/2012 | Vos et al. |
| 2012/0116863 A1 | 5/2012 | Boss et al. |
| 2012/0203822 A1 | 8/2012 | Floyd et al. |
| 2012/0330710 A1 | 12/2012 | Hauser et al. |
| 2013/0016675 A1 | 1/2013 | Cha et al. |
| 2013/0051359 A1 | 2/2013 | Skarby |
| 2013/0121147 A1 | 5/2013 | Tapia et al. |
| 2013/0166773 A1 | 6/2013 | Armstrong et al. |
| 2013/0201996 A1 | 8/2013 | Masputra et al. |
| 2014/0146666 A1 | 5/2014 | Kwan et al. |
| 2014/0173025 A1 | 6/2014 | Killick |
| 2014/0180575 A1 | 6/2014 | Lin |
| 2014/0269962 A1 | 9/2014 | Gao et al. |

* cited by examiner

SCHEDULED TRANSMISSION OF DATA

CROSS REFERENCE TO RELATED APPLICATIONS

This application is a continuation of U.S. application Ser. No. 14/790,216, filed Jul. 2, 2015, which is a continuation of U.S. application Ser. No. 13/798,531, filed Mar. 13, 2013, now U.S. Pat. No. 9,106,557, which is hereby incorporated by reference in its entirety.

BACKGROUND

Bandwidth is an important resource for modern networks. For example, traffic on a network can become heavily congested due to asymmetric bandwidth constraints that may limit upload capacity compared to download capacity. To lessen the negative effects of network congestion, improvements are needed in transmitting data.

SUMMARY

The following summary is for illustrative purposes only, and is not intended to limit or constrain the detailed description.

In some embodiments, a data transmission request may be received from a device, which may be a client. The request may be an upload request or a download request and may include a data size and other characteristics. An estimated duration for the transmission may be determined based on traffic monitored on a network. The transmission may be scheduled based on the monitored traffic and estimated duration.

In some embodiments, the data transmission may be scheduled by adding it to a queue of pending transmissions. A queue position for the transmission may be determined based on continually monitored traffic for the network and an estimated transmission duration.

In some embodiments, a data transmission may be scheduled for a future time based on an estimate that the network traffic will be low or lower at the future time. The estimate may be based on historical trends for traffic.

In some embodiments, a device, such as a client device, may send a data transmission request to a central office, such as a data processing facility, and receive, in response to the request, a message that indicates a schedule for the transmission. The message may include instructions on how to complete the transmission, including an allocated bandwidth for the transmission. The client device may forward instructions about the scheduled transmission, and in some embodiments data for the scheduled transmission, to a second device and the second device may complete the transmission.

BRIEF DESCRIPTION OF THE DRAWINGS

Aspects of the present disclosure are described by way of example with respect to the accompanying figures in which like numerals indicate similar elements.

DETAILED DESCRIPTION

In the following description, reference is made to the accompanying figures, in which are shown various illustrative embodiments. It is to be understood that other embodiments may be utilized and structural and functional modifications may be made, without departing from the scope of the present disclosure.

Figure 1:
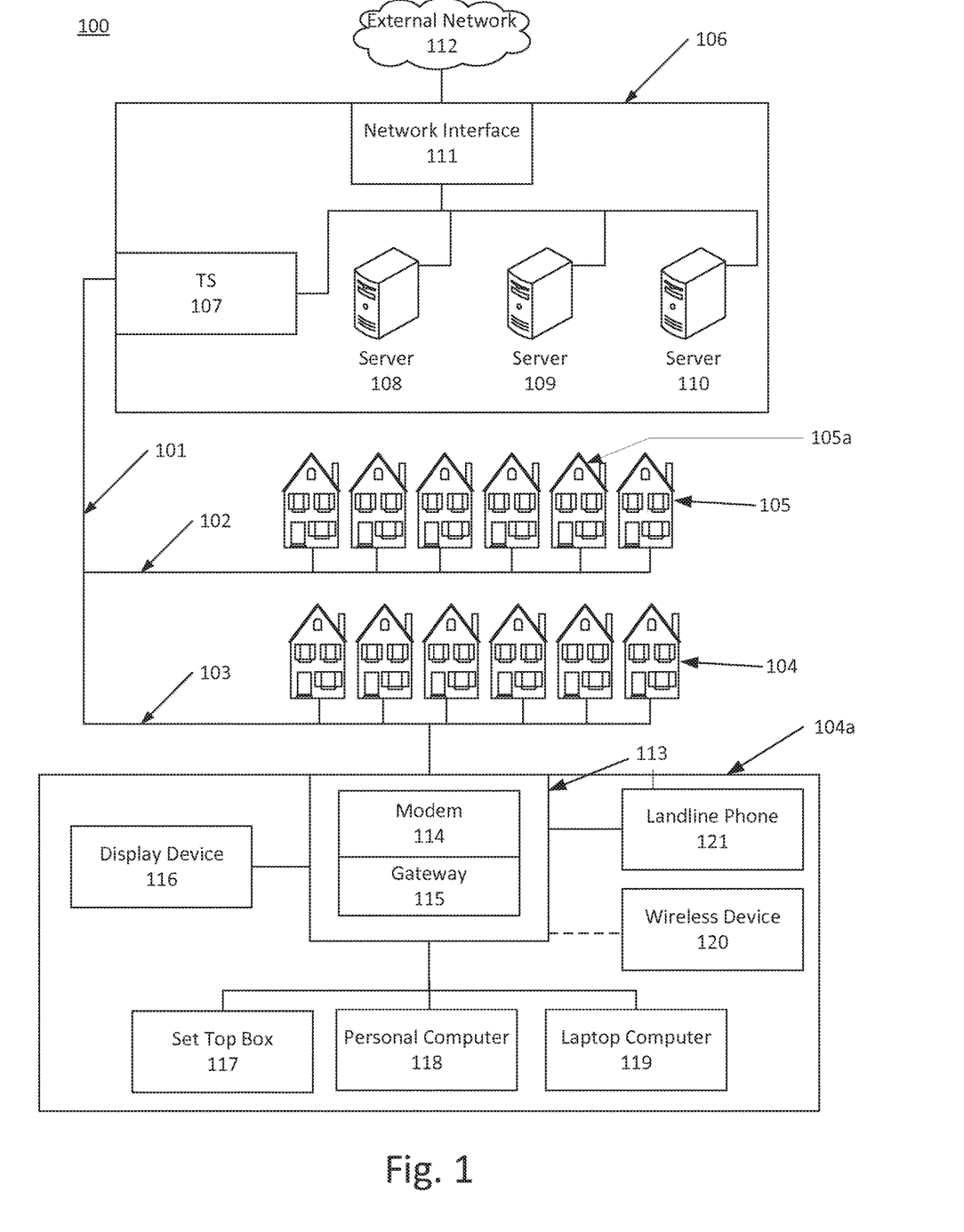
FIG. 1 illustrates an example communication network according to one or more embodiments.

FIG. 1 illustrates an example communication network 100 on which many of the various features described herein may be implemented. Network 100 may be any type of information distribution network, such as satellite, telephone, cellular, wireless, etc., and combinations thereof. Various examples may include an optical fiber network, a coaxial cable network, or a hybrid fiber/coax distribution network. Such networks 100 may use a series of interconnected communication links 101-103 (e.g., coaxial cables, optical fibers, wireless, etc.) to connect multiple premises 104 and 105 (e.g., businesses, homes, consumer dwellings, etc.) to one or more central offices 106 (e.g., local offices or head ends). A central office 106 may exchange upstream/downstream information signals over the links 101-103, with premises 104 and 105. Each premise may have one or more terminals configured to transmit/receive and process those signals.

There may be one link 101 connected to the central office 106, and it may be split a number of times, for instance, into links 102 and 103, to distribute the signal to/from various premises 104 and 105 in the vicinity (which may be up to many miles) of the central office 106. The links 101-103 may include components (not illustrated), such as splitters, filters, amplifiers, etc., to help convey the signals. Portions of the links 101-103 may be implemented with a combination of one or more of fiber-optic cable, coaxial cable, twisted shielded cable, wireless communication paths, or other signal carrying medium.

The central office 106 may include an interface, such as a termination system (TS) 107. In various examples, the interface 107 may be a cable modem termination system (CMTS), which may be a computing device configured to manage communications between devices on the network of links 101-103 and backend devices such as servers 108-110 (to be discussed further below). The interface 107 may be as specified in a standard, such as the Data Over Cable Service Interface Specification (DOCSIS) standard, published by Cable Television Laboratories, Inc. (a.k.a. CableLabs), or it may be a similar or modified device instead. The interface 107 may be configured to place data on one or more downstream signals modulated at one or more predetermined frequencies to be received by network interface 113 (e.g., including modem 114) at the various premises 104 and 105, and to receive upstream signals modulated at one or more other predetermined frequencies from those terminals.

While one network interface 113 is shown in premise 104a, each premise may include more than one terminal.

The central office 106 may also include one or more network interfaces 111, which can permit the central office 106 to communicate with various other external networks 112. These networks 112 may include, for example, networks of Internet devices, telephone networks, cellular telephone networks, fiber optic networks, local wireless networks (e.g., WiMAX), satellite networks, and any other network capable of carrying data to and from central office 106. The network interfaces 111 may include the corresponding circuitry adapted to communicate on the external networks 112, and to other devices on the networks 112 (e.g., a cellular telephone network and its corresponding cell phones).

The central office 106 may also include one or more servers 108-110. An application server 110 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). In some embodiments, an application server may be responsible for scheduling a transmission request received from devices at premises 104 and 105. Although shown separately, the servers 108 to 110 may be combined. Servers 108-110 may include one or more processors and memory storing computer executable instructions that when executed cause the processors to perform the functions of the servers.

An example premises 104a, such as a home, may include a network interface 113. The network interface 113 can include communication circuitry adapted to allow a device to communicate on one or more links 101-103 with other devices in the network. For example, the network interface 113 may include a modem 114, which may include transmitters and receivers used to communicate on the links 101-103 and with the central office 106. The modem 114 may be, for example, a coaxial cable modem (for coaxial cable lines 101-103), a fiber interface node (for fiber optic lines 101-103), twisted-pair telephone modem, cellular telephone transceiver, satellite transceiver, local Wi-Fi router or access point, or other modem device adapted to communicate over links 101-103. Also, although only one modem is shown in FIG. 1, a plurality of modems operating in parallel may be implemented within the network interface 113.

Further, the network interface 113 may include a gateway 115. The modem 114 may be connected to, or be a part of, the gateway 115. The gateway 115 may be a computing device that communicates with the modem 114 to allow one or more other devices in the premises 104a to communicate with the central office 106 and other devices beyond the central office 106. The gateway 115, in various examples, may be a set-top box (STB), digital video recorder (DVR), computer server, or any other computing device. The gateway 115 may also include (not shown) local network interfaces to exchange communication signals with entities/devices/terminals in the premises 104a, such as display devices 116 (e.g., televisions), additional STBs 117, personal computers 118, laptop computers 119, wireless devices 120 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA), smartphones, etc.), landline phones 121 (e.g. Voice over Internet Protocol—VoIP phones), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11, IEEE 802.15), analog twisted pair interfaces, Bluetooth interfaces, and others. An example premise 105a may comprise a similar premise to 104a.

Figure 2:
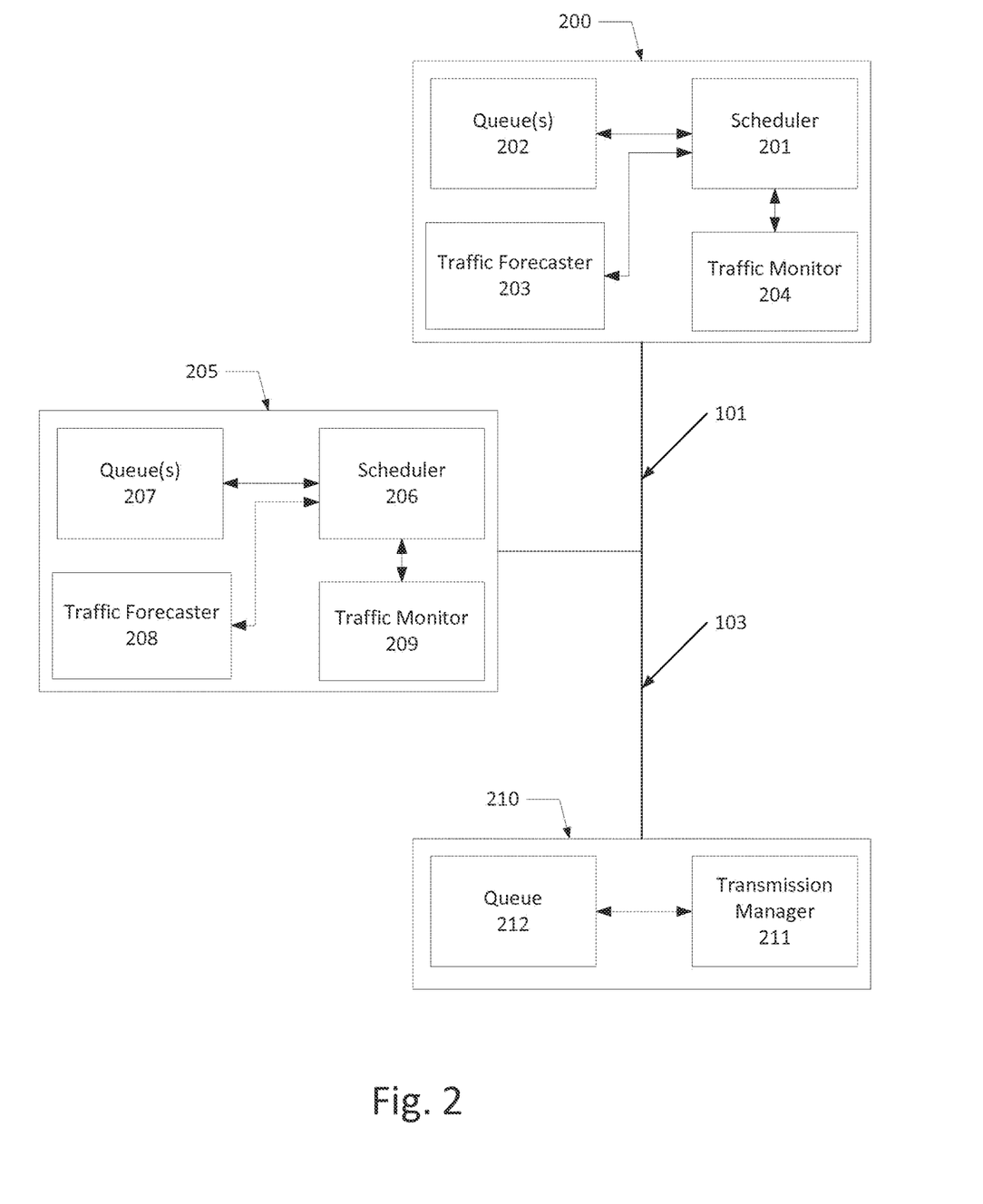
FIG. 2 illustrates a functional block diagram according to one or more embodiments.

FIG. 2 illustrates a functional block diagram according to some embodiments. For example, computing device 200 may comprise scheduler 201, one or more queues 202, traffic forecaster 203, and traffic monitor 204. Computing device 200 may be located at local office 106 and may be implemented by one or more of servers 108-110 or TS 107. Computing device 205 may comprise scheduler 206, one or more queues 207, traffic forecaster 208, and traffic monitor 209. Computing device 205 may be located somewhere along network branch 101 (e.g., where network link 101 connects with network link 103). Computing device 210 may comprise transmission manager 211 and one or more queues 212. Computing device 210 may be located at a client premises (e.g., premises 104(a)) and may further be implemented by various elements at the client premises (e.g., interface 113, set top box 117, personal computer 118, laptop computer 119, wireless device 120, etc.). In some embodiments, computing devices 200, 205, and 210 communicate with one another in order to schedule transmissions.

In computing device 200, scheduler 201 may schedule transmissions (e.g., upload transmissions or download transmissions) by communicating with queue(s) 202, traffic forecaster 203, and traffic monitor 204. One or more queue(s) 202 may comprise transmission queues and scheduler 201 may store delayed transmissions in queue(s) 202. Traffic forecaster 203 may forecast network traffic (e.g., traffic on network links 101-103) and scheduler 201 may schedule transmissions based on the forecasted traffic. Traffic monitor 204 may monitor network traffic (e.g., traffic on network links 101-103) and scheduler 201 may schedule transmissions based on the monitored traffic.

In computing device 205, scheduler 206, queue(s) 207, traffic forecaster 208, and traffic monitor 209 may operate similarly to the elements of computing device 200. In some embodiments, scheduler 206 may be responsible for scheduling transmissions for transmission requests from premises 104 on network link 103. For example, queue(s) 207 may store transmissions for premises 104, traffic forecaster 208 may forecast traffic on network link 103, and traffic monitor 209 may monitor traffic on network link 103. In some embodiments, the elements of computing device 205 communicate with the elements of computing device 200 in order to schedule transmissions for premises 104.

In computing device 210, transmission manager 211 may communicate with one or more of scheduler 206 and scheduler 201 to schedule transmissions for a client premises (e.g., premises 104(a)). Queue 212 may store delayed transmission for the premises and may further communicate with one or more of schedulers 201 and 206. Transmission manager 211 may be implemented across various computing devices at the premises (e.g., interface 113, set top box 117, personal computer 118, laptop computer 119, wireless device 120, etc.). For instance, transmission manager 211 may be a distributed application running on a plurality of computing devices. In some embodiments, one or more of computing devices 200, 205, and 210 may be omitted and/or one or more of the elements within computing devices 200, 205, and 210 may be omitted.

An example process of scheduling transmissions is described further below in FIGS. 3-5, with reference to FIGS. 1 and 2. In an illustrative example, central office 106 may schedule transmissions corresponding to transmission requests generated at premises 104 and 105. In some embodiments, a transmission request may be generated by a client/terminal, such as by gateway 115, display device 116, Set Top Box 117, personal computer 118, laptop computer 119, or wireless device 120, or other device within a premises (e.g., premises 104*a*). This request may be received by transmission manager 211. The request may be sent over the network links 101 and 103 to central office 106, and server 110 at central office 106 may implement the process of FIGS. 3-5 to schedule a transmission for the request. For example, transmission manager 211 may send the request to scheduler 201 which may schedule a transmission for the request. In some embodiments, the scheduling process illustrated in FIGS. 3-5 may be implemented at various other points on network links 101-103 by various other servers or computing devices. For example, transmission manager 211 may send the request to scheduler 206 which may schedule a transmission for the request. In some embodiments, scheduler 206 communicates with scheduler 201 to schedule the transmission.

In an illustrative example, a transmission may comprise a client/terminal sending data across a network to a computing device (e.g., uploading a picture to a server) or a client/terminal receiving data sent from a computing device across a network (e.g., downloading a video file from a peer). In some embodiments, the computing device on the other end of the transmission (e.g., sending data to the client/terminal or receiving data from the client/terminal) may comprise a server (e.g., client server system), a client/terminal (e.g., peer-to-peer system), or any other computing device capable of transmitting data.

Figure 3:
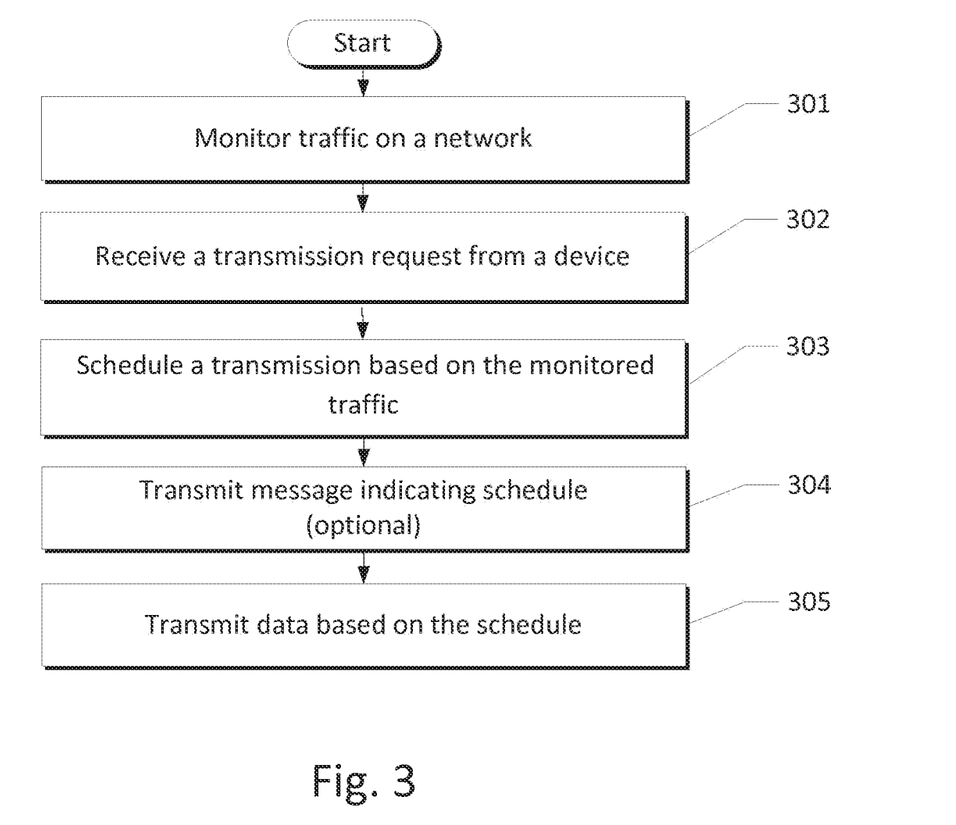
FIG. 3 illustrates an example process for scheduling transmissions according to one or more embodiments.

As illustrated in FIG. 3, the process of scheduling a transmission may begin in step 301 with monitoring traffic on a network. For example, one or more of traffic monitor 204 or traffic monitor 209 may monitor traffic (e.g., Internet Protocol (IP) data packets, Transmission Control Protocol (TCP)/IP data packets, User Datagram Protocol (UDP) data packets, cellular data packets, etc.) on network links 101-103. In some embodiments, the traffic at network link 102 is monitored separately from the traffic on network link 103. That is, premises 104 on network link 103 may have low network usage and network link 103 may therefore experience low traffic while premises 105 on network link 102 may have heavy network usage and network link 102 may experience high traffic.

In some embodiments, the transmission request being scheduled may comprise a download request (e.g., to receive data at the client/terminal) or an upload request (e.g., to send data from the client/terminal). In further embodiments, an upload request may be a delay-eligible upload request indicating that the requested upload does not need to be performed immediately. For example, a client may request to upload a large picture or video onto a server that operates a social networking website and the client may indicate in the upload request that it is a candidate to be scheduled for a future time. This may be accomplished using software resident on a client/terminal system (e.g., transmission manager 211) that indicates a request is a delay-eligible upload request.

In some embodiments, a limited amount of bandwidth may be allocated within the network for downloads, uploads, delay-eligible uploads, or a combination of these. In an illustrative example, monitoring traffic may include monitoring the traffic of downloads, uploads, delay-eligible uploads, or a combination these.

In step 302, a transmission request is received from a client/terminal. For example, the request may be received at scheduler 206 or scheduler 201. The transmission request may include a data size for the data requested to be transmitted. In some embodiments, the transmission request may comprise a download, upload, or delay-eligible upload request.

In step 303, a transmission corresponding to the request is scheduled based on the monitored traffic. For example, based on the monitored traffic being above a threshold, scheduler 201 or scheduler 206 may schedule the transmission for a future time or may add the transmission to a queue of pending transmissions. In some embodiments, the transmission is scheduled based on an estimated duration and/or file size for the transmission. For example, a request may be received from premises 105*a* on network link 102. The request may indicate a data size for the data requested to be transmitted. Based on the monitored traffic on network links 101, 102, and/or 103, an estimated duration may be determined for a transmission corresponding to the request. Based on the estimated duration being above a threshold, the transmission may be scheduled for a future time or may be added to a queue of pending transmissions.

In some embodiments, the request from a premises (e.g., premises 105*a*) may comprise a download request, an upload request, or a delay-eligible upload request and the traffic being monitored may be download traffic, upload traffic, or a combination of these. Based on monitored traffic on network links 101, 102, and/or 103, a transmission for the request may be scheduled for a future time or the transmission may be added to a queue of pending transmissions. In some embodiments, only the traffic for the type of transmission requested (e.g., upload or download) is used to determine a scheduling for the transmission. For example, for an upload request, upload traffic may be monitored to determine a scheduling for the upload transmission. In some embodiments, all traffic is monitored and is used to determine a scheduling for a transmission regardless of transmission type, direction, etc.

In some embodiments, metrics of traffic flow are calculated based on the monitored traffic. The metrics may indicate, for example, the volume of data traffic. The volume of data traffic metrics may include, in various examples, measurements of total data transfer over the period, peak instantaneous data rate within the period, average data rate over the period, and combinations thereof. The measurements may include upload data, download data, and/or combinations thereof. In some embodiments, if it is determined that one or more of the calculated metrics (e.g., traffic volume) exceeds (is above or below) a threshold, a transmission may be scheduled for a future time or may be added to a queue of pending transmissions.

In some embodiments, traffic at different points in the network may be used to determine scheduling for a transmission. For example, data transmitted from premises 105*a* passes over network links 101 and 102 to arrive at central office 106. Accordingly, traffic over network links 101 and 102 may be used to determine scheduling for a transmission from premises 105*a*. In another example, data transmitted from premises 104*a* passes over network links 101 and 103 to arrive at central office 106. Accordingly, traffic over network links 101 and 103 may be used to determine scheduling for a transmission from premises 104*a*. In some embodiments, traffic monitor 204 may monitor traffic on network link 101 and traffic monitor 209 may monitor traffic on network link 103.

In some embodiments, a message is sent to the requesting client/terminal that indicates a schedule for the transmission. The message may indicate that the transmission has been scheduled for a future time or that the transmission has been added to a queue of pending transmissions. For example, scheduler 201 may send a message to transmission manager 211.

In some embodiments, the scheduled transmission may be allocated a bandwidth within the network. For example, the bandwidth may be less than the default bandwidth for a transmission. For instance, the scheduled transmission may be an upload transmission and the allocated bandwidth for the scheduled upload transmission may be less than the default bandwidth for an upload transmission. For example, the network may be configured according to one or more DOCSIS standards, and the bandwidth allocated for the upload transmission may be less than the default bandwidth for an upload transmission in the DOCSIS standard. In some embodiments, a message sent to the client indicating a scheduling for the transmission includes various data related to the transmission, such as an allocated bandwidth for the transmission, a scheduled time for the transmission, an estimated duration time for the transmission, an estimated wait time for commencing the transmission, etc.

In some embodiments, software resident on a client/terminal (e.g., transmission manager 211) may indicate that a transmission request is a delay-eligible request. Based on this indication, a scheduler (e.g., scheduler 201) may determine that the transmission corresponding to the request should be delayed without considering traffic and/or estimated transmission duration. Accordingly, a transmission request that is indicated as a delay-eligible transmission request may be determined to be delayed by a scheduler without determining traffic is above a threshold and/or without determining an estimated duration for the transmission is above a threshold. The delay-eligible upload may be scheduled for a future time or may be added to a queue of transmissions.

Figure 4A:
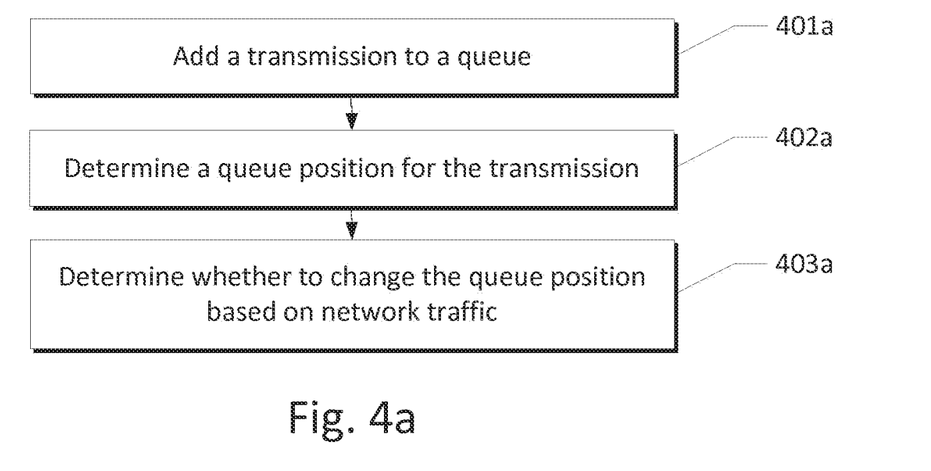
FIGS. 4a & 4b illustrate example processes for adding a transmission to a queue and scheduling a transmission according to one or more embodiments.

In some embodiments, step 303 of FIG. 3 further comprises some or all of the steps of FIG. 4*a*. For example, a scheduled transmission may be added to a transmission queue, as in step 401*a*. The queue may contain delayed transmissions. For example, based on monitored traffic being above a threshold, a transmission may be delayed for a period of time (e.g., based on a queue position for the transmission). The queue may have a defined order (e.g., sequential, interleaved, etc.). In some embodiments, the transmission queue follows a First In First Out (FIFO) priority. In some embodiments, the position for transmissions within the transmission queue may be based on monitored traffic for the client/terminal that is requesting a transmission, predicted traffic (e.g., at predetermined times) for the client/terminal that is requesting a transmission, an estimated duration for a transmission based on the data size, a relative priority for a transmission, or a combination of these. In some embodiments, the queue may comprise a comparable data structure (e.g., stack, etc.).

In some embodiments, the queue is stored in a database. The queue may comprise a queue of pointers and each pointer may point to a transmission (e.g., download, upload, or delay-eligible upload transmission). In another example, the queue may comprise a queue of transmissions (e.g. physical data that represents a download, upload, or delay-eligible upload transmission). The queue may comprise a download queue, and a download transmission corresponding to a download request (e.g., pointer or physical data) may be added to the download queue. In another example, the queue may comprise an upload queue, and an upload transmission corresponding to an upload request (e.g., pointer or physical data) may be added to the upload queue.

In a further example, the upload queue may further comprise a delay-eligible upload queue. In some embodiments, if a transmission is added to a transmission queue, a message is sent to the requesting client/terminal indicating that the transmission has been added to the queue.

In some embodiments, the queue may comprise one or more queues that may be located at central office 106 or at another computing device on network links 101, 102, or 103. For example, the queue may comprise one or more of queues 202 and 207. In some embodiments, a computing device (e.g., computing device 205) may be located at the connection where network link 101 connects with network link 102 and the connection where network link 101 connects with network link 103. In each computing device, one or more queue(s) (e.g., queue 207) may queue transmissions for the respective network link (e.g., network link 102 or network link 103). For example, a computing device that includes one or more queues located at the connection between network link 101 and network link 102 may queue transmissions for premises 105. Similarly, a computing device that includes one or more queues located at the connection between network link 101 and network link 103 may queue transmissions for premises 104.

In step 402*a*, a position may be determined in the transmission queue for the added transmission. In some embodiments, the position may be determined based on monitored traffic for the client/terminal that is requesting the transmission, predicted traffic (e.g., at predetermined times) for the client/terminal that is requesting the transmission, an estimated duration for the transmission based on the data size, a relative priority for the transmission, or a combination of these. For example, a first transmission may be requested by a client/terminal in premises 104*a* on network link 103 and a second transmission may be requested by a client/terminal in premises 105*a* on network link 102. The monitored traffic on network link 103 may be light but the monitored traffic on network link 102 may be heavy. Because of this, an estimated duration for the first transmission may be less than an estimated duration for the second transmission. In this example, a determined position for the first transmission may be higher in priority (e.g., positioned higher in the queue) than a determined position for the second transmission based on the monitored traffic for the network links 103 and 102 and based on the estimated durations for the first transmission and the second transmission.

In step 403*a*, it is determined whether a queue position for a queued transmission should be changed based on the monitored traffic. For the above example, after a period of time, if the traffic on network link 103 increases (e.g., increases in volume) and the traffic on network link 102 decreases (e.g., decreases in volume), the estimated durations for first and second transmissions may change. If the change in traffic alters the estimated durations such that the new estimated duration for the second transmission is less than the new estimated duration for the first transmission, then the determined position for the second transmission may change to a higher priority (e.g., positioned higher in the queue) than the determined position for the first transmission.

Figure 4B:
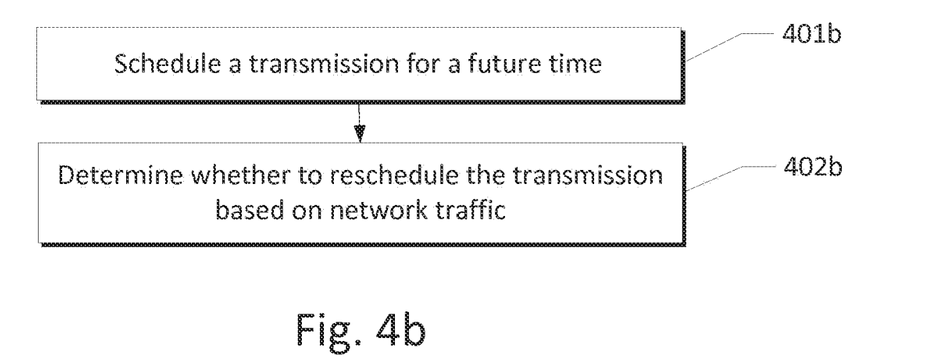

In some embodiments, step 303 of FIG. 3 further comprises one or more of the steps of FIG. 4*b*. In an illustrative example, a transmission may be scheduled for a future time, as in step 401*b*. In some embodiments, the future time for the scheduled transmission may be based on estimated network traffic at the future time. For example, historical trends may be analyzed to forecast network traffic during various points in time. Traffic forecaster 203 and traffic forecaster 208 may forecast traffic on their respective network links. For example, traffic forecaster 203 may forecast traffic on network link 101 and traffic forecaster 208 may forecast traffic on network link 103. Network link 102 may also have a traffic forecaster (not depicted) or one or more of traffic forecaster 203 and/or traffic forecaster 208 may forecast traffic on network link 102. In some embodiments, traffic forecaster 203 forecasts traffic for all of network links 101-103. The one or more traffic forecasters may be connected to one or more databases that store historical traffic data about the network (e.g., type of traffic (upload or download traffic), time of day, congestion, etc.). In some embodiments, the estimated traffic at the future time is based on a time of day for the future time, a day of week for the future time, whether the future time occurs on a weekday, whether the future time occurs on a weekend, whether the future time occurs on a holiday, or any combination thereof. For example, a transmission may be requested at 3:00 pm on a Tuesday afternoon but may be scheduled for 2:00 am on the following Wednesday morning because historical trends show that network traffic at 2:00 am on Wednesday mornings is low. In some embodiments, the estimated traffic at the future time is determined to be less than the monitored traffic.

In step 402*b*, it is determined whether the scheduled future time for the transmission should be rescheduled based on the monitored traffic. In an illustrative example, if a transmission is scheduled for a future time because it was estimated that the future time would have low traffic, but at that future time, or a predetermined amount of time away from the future time, the monitored traffic is determined to be above a predetermined threshold, the transmission may be rescheduled to a new future time estimated to have low traffic (e.g., by one or more of traffic forecasters 208 and 203). In some embodiments, when a transmission is rescheduled a message may be sent to the requesting client/terminal indicating the rescheduled future time for the transmission.

In some embodiments, step 303 of FIG. 3 includes scheduling a transmission based on premises information. For example, a transmission request may be received from premises 104(*a*). Premises information may be stored about premises 104(*a*) in a database located at central office 106, at some other location on network links 101-103, or at any other suitable location. The premises information may include a service type (e.g., service package), a transmission history, and other suitable information about premises 104(*a*). A service type may define a service tier for the premises (e.g., premium, etc.) and may include a predetermined number of immediate transmissions for the premises depending on transmission type (e.g. upload transmission or download transmission) and size (e.g., above or below a predetermined threshold). For example, a premises in a premium service tier may be allotted five immediate upload transmissions per month that are above a predetermined size threshold. A transmission history may log previous transmissions for the premises. For example, a transmission history for a premises may log the number of immediate transmissions for the current month and for a predetermined number of previous months. The transmission history may also log the number of transmissions, the size of the transmissions, the type of the transmission (e.g., upload transmission or download transmission), a time of day for each transmission, etc.

In an example, premises 104(*a*) may request an upload transmission of a certain size. Based on monitored traffic and/or an estimated duration for the transmission being above a threshold, a scheduler (e.g., scheduler 201) may determine that the upload transmission should be delayed. Based on this decision, the service type may be checked to determine premises 104(*a*)'s allotment of immediate upload transmissions of the requested size (e.g., per month) and the transmission history may be checked to determine the previous number of immediate upload transmissions for premises 104(*a*) (e.g., for the current month). If premises 104(*a*) is above the allotment for immediate upload transmission of the requested size, the upload transmission may be delayed (e.g., scheduled for a future time or placed in a queue). If premises 104(*a*) is below the allotment for immediate upload transmissions of the requested size, a scheduler (e.g., scheduler 201) may allow the upload transmission to immediately begin transmitting (e.g., not delay the transmission).

In some embodiments, a service tier may additionally include a predetermined number of rushed transmissions (e.g., within 1 hour, within 2 hours, etc.) and a transmission history may log the number of rushed transmissions for a premises. For example, a premises may request an upload transmission, and a scheduler may determine that the transmission should be delayed, as further detailed above. If the premises is below the allotment for rushed transmissions (e.g., based on the service type and transmission history), a scheduler may schedule the transmission within a rushed time window (e.g., within 1 hour, within 2 hours, etc.).

In some embodiments, the transmission history may log the number of delay-eligible transmissions (e.g., including size, type (upload transmission or download transmission), a time of day, etc.) for a premises. Based on the number of delay-eligible transmissions being above a threshold, a premises may receive incentives. For example, if a premises transmits an upload transmission above a threshold size as a delay-eligible upload, the premises may gain an extra immediate transmission allotment for an upload transmission of that size. The incentive may also include a discount on a bill, other monetary incentives, or any other suitable incentive.

In some embodiments, step 303 of FIG. 3 proceeds to step 304 (optional) where a message is transmitted indicating a schedule for the transmission. For example, a message may be sent to the requesting client/terminal that indicates a scheduled future time for the requested transmission or that indicates the transmission has been added to a queue. Where a scheduled future time is indicated in a message, the scheduled future time may be valid upon receipt of the message and the client/terminal may begin transmitting data at the scheduled future time. In another example, the scheduled future time is not valid upon receipt of the message and the client may not begin transmitting data at the scheduled future time until a second message (e.g., granting message) is sent to the client/terminal. In some embodiments, when a transmission is rescheduled for a new future time, a message may be sent to the requesting client/terminal indicating the new schedule for the transmission.

The process of FIG. 3 may proceed to step 305, where the data is transmitted based on the schedule. In some embodiments, the data may be transmitted based on the transmission reaching the front (e.g., highest in priority) of a transmission queue or based on detecting that the scheduled time for the transmission is occurring, has occurred, or will occur within a predetermined amount of time.

In an illustrative example, a queued transmission reaching the front of a queue may be transmitted based on a monitored traffic being below a threshold, a duration for the transmission being below a threshold, or a combination of these. In an illustrative example, once permission is granted to a queued transmission, the queue may be updated by removing the transmission from the queue.

In an example, transmitting the data based on the schedule may include sending a granting message to the requesting client/terminal that grants permission to transmit the data. In some embodiments, the message may include instructions about an allocated bandwidth for the transmission. For example, the allocated bandwidth may be less than a default bandwidth for a transmission. The transmission may be a download transmission and the allocated bandwidth may be less than the default bandwidth for a download transmission. For instance, the network may be configured according to one or more DOCSIS standards, and the bandwidth for the download transmission may be less than the default bandwidth for a download transmission in the DOCSIS standard. In some embodiments, the transmission may be an upload transmission and the allocated bandwidth may be less than the default bandwidth for an upload transmission. For instance, the network may be configured according to one or more DOCSIS standards, and the bandwidth for the upload transmission may be less than the default bandwidth for an upload transmission in the DOCSIS standard.

Figure 5:
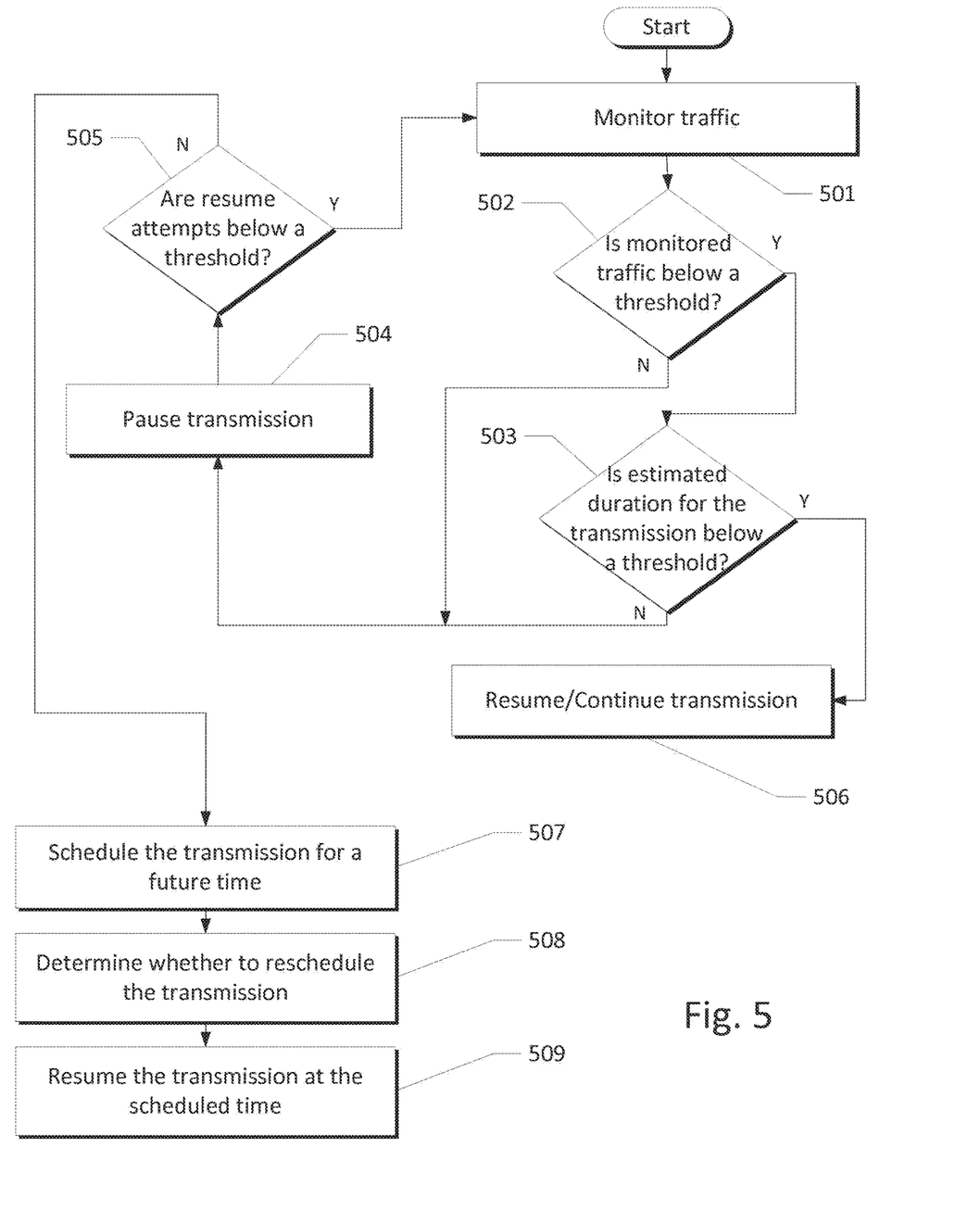
FIG. 5 illustrates an example process for pausing and resuming a transmission according to one or more embodiments.

In some embodiments, after the data begins to be transmitted, the process of scheduling a client transmission may move to step 501 of FIG. 5. In step 501, traffic may continue to be monitored on the network (e.g. by traffic monitor 204). The monitored traffic may comprise traffic on the network path between a central office 106 and the transmitting premises, traffic for a particular type of transmission (e.g., upload traffic, download traffic, or both), or a combination of these.

From step 501, the process may move to step 502, where it is determined whether the monitored traffic is below a threshold. If the monitored traffic is below the threshold (e.g., total data transfer is greater than a maximum limit), the process moves to step 504. If the monitored traffic is below a threshold, the process moves to step 503, where it is determined whether an estimated duration for the transmission is below a threshold. The estimated duration may be based on the partially completed transmission (e.g., untransmitted portion of the transmission) rather than the entire transmission. The estimate can be determined similar to previously described estimates for transmission durations (e.g., based on traffic on the network between central office 106 and the transmitting premises, a data size for the partially completed transmission, an average data rate available for the transmission, etc.). If the estimated duration for the transmission is determined to be below a threshold, the process moves to step 506. If the estimated duration is not determined to be below a threshold, the process moves to step 504.

At step 504, the transmission may be paused. In some embodiments, the paused transmission is marked as partially completed. For example, the marking may be stored in memory and may indicate the percentage of data that has been transmitted prior to the pause. The marking may be used to resume the transmission from the partially completed state rather than restart the transmission. In an illustrative example, the transmission may be paused by sending a message to the client/terminal with instructions to pause the transmission. Steps 501-505 may be performed multiple times (e.g., as a loop), based on the outcome of step 502 and step 503. At step 504, a transmission that has already been paused, and marked in some embodiments, may continue to be paused.

In some embodiments, the process may move from step 504 to step 505, where the number of attempts (e.g., loops executed from steps 501-505) is compared to a threshold. For example, the number of attempts may be stored in memory. If the number of attempts are below a threshold, the process may move back to step 501. In some embodiments, the process may remain at step 501 for a period of time (e.g., a predetermined period of time) before attempting to resume the paused transmission by progressing to step 502.

At step 506, the paused, and in some embodiments marked, transmission is resumed. In an illustrative example, the paused transmission may be resumed from the partially completed portion (e.g., resumed from the non-transmitted portion). The paused transmission may be resumed from the partially completed portion based on a marking for the paused transmission, where the marking indicates the portion of the transmission that has been previously transmitted. In some iterations a transmission may be un-paused (e.g., actively transmitting) at step 506 and, in an illustrative example, the un-paused transmission may continue to transmit at step 506.

In some embodiments, at step 505, if the number of attempts is not below a threshold, the process may move to step 507, where the paused transmission is scheduled for a future time. Scheduling a transmission for a future time may include the various embodiments described for scheduling a transmission for a future time (e.g., estimating traffic for the future time based on historical trends, etc.). After the scheduling is completed, the process may move to step 508 where, at a predetermined duration prior to the scheduled time, it is determined whether the scheduled time should be rescheduled based on monitored traffic. For example, if a transmission is scheduled for a future time because it was estimated that the future time would have low traffic, but at or near that future time (e.g., a predetermined proximity to the future time) the traffic is monitored to be greater than a predetermined threshold, the transmission may be rescheduled to a new future time estimated to have low traffic. If, in step 508, it is determined that the transmission should not be rescheduled, the process moves to step 509, where the paused transmission is resumed at the scheduled time. In some embodiments, the transmission may be resumed by sending a message to the client with instructions to resume the transmission. The paused transmission may be resumed as described in various embodiments (e.g., resuming the paused transmission based on a marking, etc.). The steps 502-509 of FIG. 5 may be performed by a scheduler (e.g., scheduler 201).

While FIG. 5 illustrates a check where both the monitored traffic is be below a threshold (e.g., step 502) and the estimated duration for the transmission is be below a threshold (e.g., step 503) in order for the paused transmission to be resumed, this is only an example, and in some embodiments only one of these two values need be below a threshold to resume the paused transmission (e.g., progress to step 506). More generally, some of the steps in FIG. 5 may be omitted or rearranged.

An embodiment of a process of transmitting scheduled transmissions is described further below in FIGS. 6-7, with reference to FIGS. 1 and 2. In an illustrative example, central office 106 (e.g., scheduler 201) may schedule transmissions corresponding to transmission requests sent from premises 104 and 105. In some embodiments, a request for transmission may be sent from premises 104a (e.g., from transmission manager 211) by gateway 115, display device 116, Set top box 117, personal computer 118, laptop computer 119, or wireless device 120. The request may be sent over the network links 101 and 103 to central office 106, and server 110 at central office 106 may schedule a transmission for the request.

Figure 6:
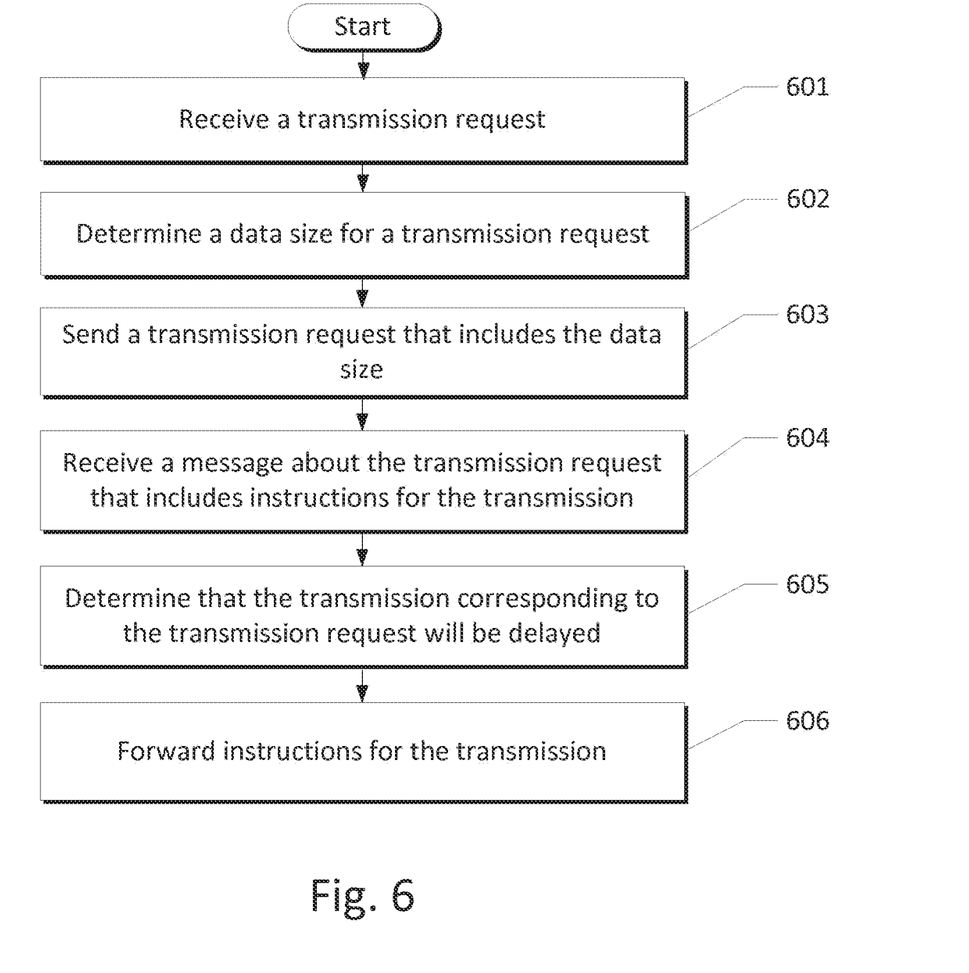
FIG. 6 illustrates an example process for requesting a transmission according to one or more embodiments.
Figure 7:
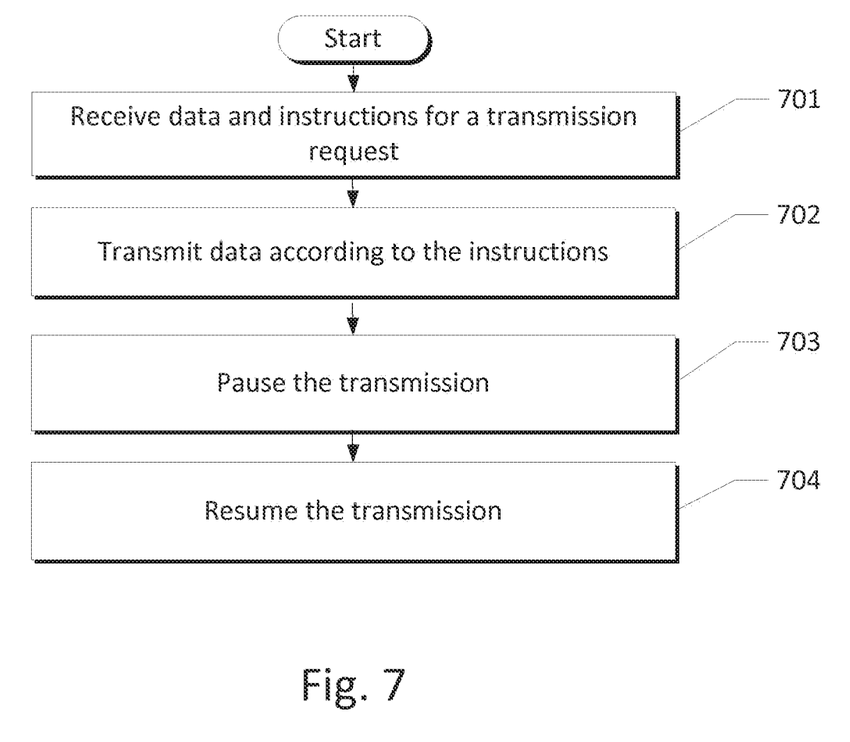
FIG. 7 illustrates an example process for completing a requested transmission according to one or more embodiments.

In some embodiments, the transmission process illustrated in FIGS. 6-7 may include multiple elements at premises 104a. In an illustrative example, laptop 119 may generate a transmission request that is sent to modem 114 and further routed to central office 106 over network links 101 and 103. After communicating with central office 106, laptop 119 may forward instructions corresponding to the transmission request to network interface 113, and network interface 113 may then communicate with central office 106 and complete the transmission. After communicating with central office 106, laptop 119 may forward instructions to any of network interface 113, including modem 114 and gateway 115, or set top box 117, and the element receiving the data may be configured to complete the transmission. For example, laptop 119 and the receiving network element may both be connected to a network (e.g., LAN, WLAN, etc.) that includes modem 114 and laptop 119 may forward the instructions to the receiving network element over the network. In some embodiments, after forwarding the instructions, laptop 119 may disconnect from the network and the receiving network element may complete the transmission. Accordingly, after forwarding instructions to the receiving network element, laptop 119 may sever all network connections with local office 106 or any other computing device used to schedule the transmission, and the receiving network element may complete the transmission.

As illustrated in FIG. 6, in an embodiment, the process of forwarding a scheduled transmission may begin in step 601 with receiving a transmission request. For example, a transmission request may be generated at laptop 119 and may be received by a software application on laptop 119. This software application may be a native application that is used to communicate with network interface 113 and central office 106. For example, the software application may comprise transmission manager 211. In some embodiments, the software application, network interface 113, and central office 106 may be configured to communicate with one another, for instance, because these elements are affiliated with an internet service provider (ISP) and/or any other type of service provider. In an illustrative example, the transmission request may comprise a download request, an upload request, or a delay-eligible upload request, as previously described.

In step 602, a data size is determined for the transmission request. In an illustrative example, the software application that receives the transmission request may determine the size of the data that corresponds to the request. The transmission request may comprise an upload request and a software application may determine a data size for the data requested to be uploaded. In some embodiments, the software application (e.g., transmission manager 211) may further determine whether the data that corresponds to the upload may be compressed. If the data can be compressed, the software application may compress the data and determine the data size to be the compressed data size. If the data cannot be compressed, the data size may be determined to be the size of the data that corresponds to the request. In some embodiments, the transmission request may comprise a download request, and the data size for the download may be received by the software application with the download request.

In step 603, a transmission request that includes the determined data size may be sent. For example, the request may be sent from a device on premises 104a, such as laptop 119, to central office 106 via network interface 113 and over network links 101 and 103. In some embodiments, the request may be sent by a software application on laptop 119 that is configured to communicate with network interface 113 and central office 106 (e.g., transmission manager 211).

In step 604, a message is received in response to the transmission request that includes instructions about the transmission. The message may be sent from central office 106 (e.g., by scheduler 201), received by laptop 119 on premises 104a, and routed to a software application on laptop 119 configured to communicate with network interface 113 and central office 106 (e.g., transmission manager 211). In some embodiments, server 110 at central office 106 determines a schedule for a transmission corresponding to the request, as discussed above, and transmits a message to premises 104a that includes instructions indicating a schedule for the transmission. For example, the instructions may indicate a scheduled future time for the transmission or may indicate that the transmission has been added to a queue of transmissions.

In some embodiments, the received message may include instructions about an allocated bandwidth for the transmission. For example, the transmission may comprise a download transmission and the allocated bandwidth for the download transmission may be less than the default bandwidth for a download transmission. In another example, the transmission may comprise an upload transmission and the allocated bandwidth for the upload transmission may be less than the default bandwidth for an upload transmission.

In step 605, it is determined that the transmission will be delayed. For example, the message received at laptop 119 may include instructions that the transmission has been scheduled for a future time or has been added to a queue of transmissions.

In step 606, the instructions received in the message about the transmission are forwarded. In some embodiments, the transmission may comprise an upload transmission, and laptop 119 may forward the data to be uploaded and instructions for the upload transmission to one of set top box 117, modem 114, gateway 115, or any other element of network interface 113. The element that receives the data and instructions may be configured to perform the transmission. For example, the element may include software configured to communicate with central office 106. A software application on laptop 119 configured to communicate with one or more of these elements (e.g., set top box 117, modem 114, gateway 115, etc.) may forward the data and instructions. In some embodiments, the instructions may include an address for the data to be uploaded (e.g., network address where the data is to be uploaded) and/or an allocated bandwidth for the upload transmission. The instructions may also indicate a scheduling for the upload transmission (e.g., a scheduled future time for the upload transmission or an indication that the upload transmission has been queued).

In some embodiments, the transmission may comprise a download transmission. For example, laptop 119 may forward instructions for the download transmission to one of set top box 117, modem 114, gateway 115, or any other element of network interface 113. The element that receives the instructions may be configured to perform the transmission. In some embodiments, the instructions may include an address for the data to be downloaded (e.g., network address where the data is to be downloaded) and/or an allocated bandwidth for the download transmission. The instructions may also indicate a scheduling for the download transmission (e.g., a scheduled future time for the download transmission or an indication that the download transmission has been queued).

In some embodiments, when the instructions received about the transmission are forwarded, contact information is sent. For example, laptop 119 may forward instructions and, in some embodiments data, to a network element (e.g., set top box 117, modem 114, gateway 115, or any other suitable network element) and laptop 119 may also send contact information for the network element that receives the instructions to central office 106 (e.g., server 110, TS 107). The contact information may uniquely identify an address for the network element (e.g., IP address, MAC address, etc.). In some embodiments, the contact information is sent in a message that includes an indication that the network element identified by the contact information will perform the transmission. For example, the message may indicate that further messages about the transmission are to be sent to the network element identified by the contact information.

In some embodiments, once the instructions are forwarded, the forwarding device may disconnect for the network. For example, laptop 119 may forward instructions about a transmission to a network element on a network, where the network comprises laptop 119, modem 114, and the receiving network element. Once the instructions are forwarded, laptop 119 may disconnect from the network and the receiving network element may complete the transmission. In some embodiments, the steps 601-606 of FIG. 6 are performed by transmission manager 211.

FIG. 7 illustrates an embodiment of a process of transmitting a scheduled transmission. Any of set top box 117, modem 114, gateway 115, or any other element of network interface 113 may perform the process of FIG. 7. In some embodiments, the element or elements performing the process of FIG. 7 are configured to communicate with interface network 113 and central office 106, for instance, because these elements are all affiliated with an internet service provider (ISP) and/or any other type of service provider. For example, the element or elements performing the process of FIG. 7 may include transmission manager 211. In some embodiments, the element or elements may be coupled to a modem (e.g., modem 114).

The process of FIG. 7 may begin at step 701 with data being received corresponding to a transmission and instructions being received about the transmission. In some embodiments, the data and instructions may be sent from a premises device (e.g., laptop 119) coupled to the receiving network element. The transmission may comprise an upload transmission and the instructions may include a schedule for the upload transmission, an address (e.g., network address) for the upload transmission, and the data to be uploaded. In some embodiments, the transmission may be a download transmission and instructions may include a schedule for the download transmission and an address (e.g., network address) for the download transmission.

In some embodiments, the received instructions may include instructions about an allocated bandwidth for the transmission. For example, the transmission may comprise a download transmission and the allocated bandwidth for the download transmission may be less than the default bandwidth for a download transmission. In another example, the transmission may comprise an upload transmission and the allocated bandwidth for the upload transmission may be less than the default bandwidth for an upload transmission.

In some embodiments, the transmission is stored in a local queue of pending transmission. For example, a software application (e.g., transmission manager 211) may receive the data corresponding to the transmission and the instructions about the transmission, and the application may queue the transmission in a local transmission queue (e.g., queue 212). The local queue may store the transmission as a pointer to the transmission or as physical data that represents the transmission.

In step 702, the data is transmitted according to the instructions. In some embodiments, the instructions may indicate that the transmission is scheduled for a future time. Accordingly, the process may wait until the scheduled time to begin the transmission. In some embodiments, the process may begin transmitting when it is detected that the scheduled time for the transmission is occurring, has occurred, or will occur within a predetermined amount of time. In other embodiments, the process may be required to wait for a granting message (e.g., sent from central office 106) in order to begin transmitting. In some embodiments, a message may be received from central office 106 with new instructions that indicate a new scheduled time for the transmission. The process may then wait until the new scheduled time to begin the transmission.

In some embodiments, the instructions may indicate that the transmission has been added to a queue of transmissions (e.g., queue 207, queue 202). In this example, the process may wait for a message (e.g., a granting message) that indicates the transmission has reached a point in the queue where the transmission may begin. In an example, this message (e.g., granting message) may be sent from central office 106 (e.g., server 110, TS 107, scheduler 201). In some embodiments, once the transmission begins transmitting, the transmission may be removed from the local queue (e.g., queue 212).

In step 703, the transmission may be paused. For example, a pause message may be received that includes instructions to pause the transmission. In this example, the message may be sent from central office 106 (e.g., server 110, TS 107). In some embodiments, the pause message includes a rescheduled time for the transmission.

In step 704, the transmission may be resumed. In some embodiments, the transmission may be resumed after receiving a resume message. The resume message may be sent from central office 106. In some embodiments, the transmission may be resumed according to instructions in the pause message that indicate a rescheduled time for the transmission. In this example, the transmission may be resumed at the rescheduled time without receiving a resume message. In some embodiments, steps 701-704 of FIG. 7 are performed by transmission manager 211.

In some embodiments, the transmission may be a download, and once the download is completed, the downloaded data is retrieved by the client/terminal that requested the download. For example, the download may have been requested by laptop 119, and laptop 119 may have forwarded instructions to complete the download to network interface 113. Network interface 113 may then complete the download and laptop 119 may retrieve the downloaded data from network interface 113. In some embodiments, network interface 113 sends a message to laptop 119 when the download is completed.

In some embodiments, the transmission request is generated at wireless device 120. For example, wireless device 120 may generate the request while disconnected from a home network. A software application on wireless device 120 (e.g., transmission manager 211) may receive the transmission request and may further detect that wireless device 120 is not connected to the home network. The software application may wait until wireless device 120 connects to the home network to send the transmission request. For instance, the software application may wait until wireless device 120 is connected to the home network to perform step 603 of FIG. 6.

Figure 8:
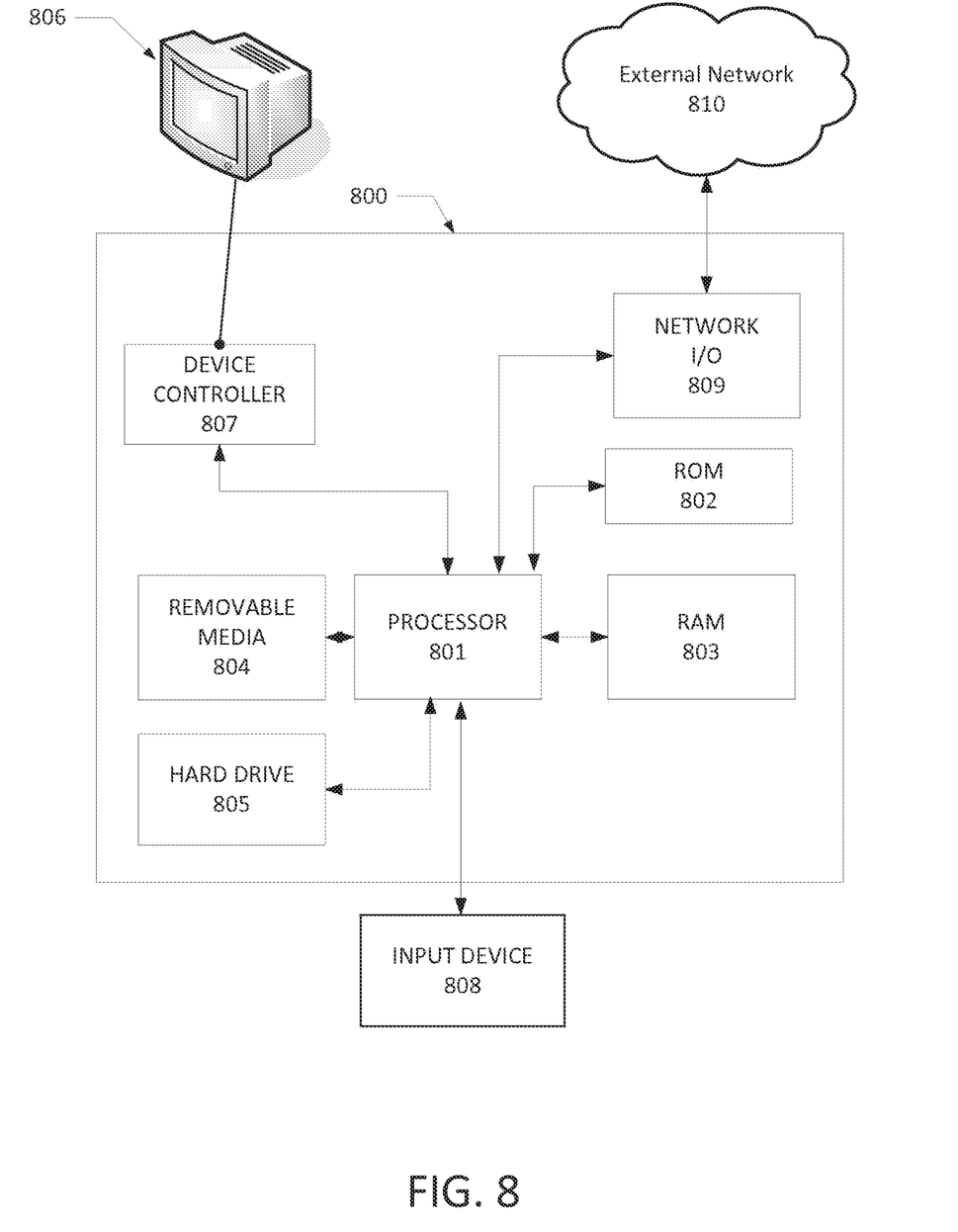
FIG. 8 illustrates an example general computing device according to one or more embodiments.

FIG. 8 illustrates hardware elements that can be used to implement any of the various computing devices discussed herein. For example, a device such as computing device 800 may be used to implement server 108, server 109, server 110, terminal system 107, network interface 113, gateway 115, set top box 117, personal computer 118, laptop computer 119 or wireless device 120. The computing device 800 may include one or more processors 801, which may execute instructions of a computer program to perform any of the features described herein. The instructions may be stored in a computer-readable medium or memory, to configure the operation of the processor(s) 801. For example, instructions may be stored in a read-only memory (ROM) 802, random access memory (RAM) 803, removable media 804, such as a Universal Serial Bus (USB) drive, compact disk (CD) or digital versatile disk (DVD), floppy disk drive, or other removable storage medium. Instructions may also be stored in an attached (or internal) hard drive 805. The computing device 800 may include one or more output devices, such as a display 806 (e.g., an external television), and may include one or more output device controllers 807, such as a video processor. There may also be one or more user input devices 808, such as a remote control, keyboard, mouse, touch screen, microphone, etc. The computing device 800 may also include one or more network interfaces, such as a network input/output (I/O) circuit 809 (e.g., a network card, wireless transceiver, etc.) to communicate with an external network 810. The network input/output circuit 809 may be a wired interface, wireless interface, or a combination of the two. In some embodiments, the network input/output circuit 809 may include a modem (e.g., a cable modem), and the external network 810 may include the communication links 101-103, the external network 112, an in-home network, a wireless, coaxial, fiber, or hybrid fiber/coaxial distribution system (e.g., a DOCSIS network), or other network.

The FIG. 8 hardware configuration is one example. Modifications may be made to add, remove, combine, divide, etc. components of the computing device 800 into different arrangements. Additionally, the same components (e.g., processor 801, ROM storage 802, display 806, etc.) may be used to implement any of the other computing devices and components described herein. For example, the various components herein may be implemented using computing devices having components such as a processor executing computer-executable instructions stored on a computer-readable medium, as illustrated in FIG. 8. Some or all of the components described herein may be a combination of hardware and software, and may co-exist in a common physical platform (e.g., a requesting entity can be a separate software process and program from the requesting entity, both of which may be executed as software on a common computing device).

One or more aspects of the disclosure may be embodied in computer-usable data and/or computer-executable instructions, such as in one or more program modules, executed by one or more computers or other devices. Program modules may include routines, programs, objects, components, data structures, etc. that perform particular tasks or implement particular data types when executed by a processor in a computer or other data processing device. The computer executable instructions may be stored on one or more computer readable media such as a hard disk, optical disk, removable storage media, solid state memory, RAM, etc. In various embodiments, the functionality of the program modules may be combined or distributed across multiple computing devices. In addition, the functionality over the various embodiments described herein may be embodied in whole or in part in firmware or hardware equivalents such as integrated circuits, field programmable gate arrays (FPGA), and the like.

Although example embodiments are described above, the various features and steps may be combined, divided, omitted, and/or augmented in any desired manner, depending on the specific outcome and/or application. Various alterations, modifications, and improvements will readily occur to those skilled in art. Such alterations, modifications, and improvements as are made obvious by this disclosure are intended to be part of this description though not expressly stated herein, and are intended to be within the spirit and scope of the disclosure. Accordingly, the foregoing description is by way of example only, and not limiting. This patent is limited only as defined in the following claims and equivalents thereto.

The invention claimed is:

1. A method comprising:
receiving a request for a requested upload;
scheduling, based on a current upstream bandwidth and an estimated future upstream bandwidth, the requested upload for a future time;
determining, based on a monitored traffic level at the future time, priorities associated with a plurality of scheduled uploads that are scheduled for the future time, wherein the plurality of scheduled uploads comprise the requested upload, by;
determining, at the future time, a first traffic level associated with a first computing device;
determining, at the future time, a second traffic level associated with a second computing device; and
after determining that the second traffic level is higher than the first traffic level, assigning a higher priority to a first upload, of the plurality of scheduled uploads, that is associated with the first computing device; and
sending, based on the priorities, the plurality of scheduled uploads.

2. The method of claim 1, wherein the sending the plurality of scheduled uploads comprises:
beginning sending of the requested upload; and
temporarily pausing the requested upload based on a subsequent future traffic level.

3. The method of claim 1, wherein sending further comprises arranging the plurality of scheduled uploads in a transmission queue based on estimated durations for each of the plurality of scheduled uploads.

4. The method of claim 1, further comprising:
granting a permission, to transmit data, to an upload of the plurality of scheduled uploads; and
monitoring traffic levels on a network after granting the permission to transmit data.

5. An apparatus comprising:
one or more processors; and
memory storing instructions that, when executed by the one or more processors, cause the apparatus to:
receive a request for a requested upload;
schedule, based on a current upstream bandwidth and an estimated future upstream bandwidth, the requested upload for a future time;
determine, based on a monitored traffic level at the future time, priorities associated with a plurality of scheduled uploads that are scheduled for the future time, wherein the plurality of scheduled uploads comprise the requested upload, by;

determining, at the future time, a first traffic level associated with a first computing device;
determining, at the future time, a second traffic level associated with a second computing device; and
after determining that the second traffic level is higher than the first traffic level, assigning a higher priority to a first upload, of the plurality of scheduled uploads, that is associated with the first computing device; and
send, based on the priorities, the plurality of scheduled uploads.

6. The apparatus of claim 5, wherein the instructions, when executed by the one or more processors, further cause the apparatus to:
begin sending of the requested upload; and
temporarily pause the requested upload based on a subsequent future traffic level.

7. The apparatus of claim 5, wherein the instructions, when executed by the one or more processors, further cause the apparatus to:
arrange the plurality of scheduled uploads in a transmission queue based on estimated durations for each of the plurality of scheduled uploads.

8. The apparatus of claim 5, wherein the instructions, when executed by the one or more processors, further cause the apparatus to:
grant a permission, to transmit data, to an upload of the plurality of scheduled uploads; and
monitor traffic levels on a network after granting the permission to transmit data.

9. A system comprising:
an apparatus and
a requesting device;
wherein the apparatus comprises:
one or more processors; and
memory storing instructions that, when executed by the one or more processors, cause the apparatus to:
receive a request for a requested upload;
schedule, based on a current upstream bandwidth and an estimated future upstream bandwidth, the requested upload for a future time;
determine, based on a monitored traffic level at the future time, priorities associated with a plurality of scheduled uploads that are scheduled for the future time, wherein the plurality of scheduled uploads comprise the requested upload, by;
determining, at the future time, a first traffic level associated with a first computing device;
determining, at the future time, a second traffic level associated with a second computing device; and
after determining that the second traffic level is higher than the first traffic level, assigning a higher priority to a first upload, of the plurality of scheduled uploads, that is associated with the first computing device; and
send, based on the priorities, the plurality of scheduled uploads; and
wherein the requesting device comprises:
one or more processors; and
memory storing instructions that, when executed by the one or more processors of the requesting device, cause the requesting device to send the request for the requested upload.

10. The system of claim 9, wherein the instructions stored in the memory of the apparatus, when executed by the one or more processors of the apparatus, further cause the apparatus to:
begin sending of the requested upload; and
temporarily pause the requested upload based on a subsequent future traffic level.

11. The system of claim 9, wherein the instructions stored in the memory of the apparatus, when executed by the one or more processors of the apparatus, further cause the apparatus to:
arrange the plurality of scheduled uploads in a transmission queue based on estimated durations for each of the plurality of scheduled uploads.

12. The system of claim 9, wherein the instructions stored in the memory of the apparatus, when executed by the one or more processors of the apparatus, further cause the apparatus to:
grant a permission, to transmit data, to an upload of the plurality of scheduled uploads; and
monitor traffic levels on a network after granting the permission to transmit data.

13. A non-transitory computer-readable medium storing instructions that, when executed, cause:
receiving a request for a requested upload;
scheduling, based on a current upstream bandwidth and an estimated future upstream bandwidth, the requested upload for a future time;
determining, based on a monitored traffic level at the future time, priorities associated with a plurality of scheduled uploads that are scheduled for the future time, wherein the plurality of scheduled uploads comprise the requested upload, by;
determining, at the future time, a first traffic level associated with a first computing device;
determining, at the future time, a second traffic level associated with a second computing device; and
after determining that the second traffic level is higher than the first traffic level, assigning a higher priority to a first upload, of the plurality of scheduled uploads, that is associated with the first computing device; and
sending, based on the priorities, the plurality of scheduled uploads.

14. The computer-readable medium of claim 13, wherein the instructions, when executed, further cause:
beginning sending of the requested upload; and
temporarily pausing the requested upload based on a subsequent future traffic level.

15. The computer-readable medium of claim 13, wherein the instructions, when executed, further cause:
arranging the plurality of scheduled uploads in a transmission queue based on estimated durations for each of the plurality of scheduled uploads.

16. The computer-readable medium of claim 13, wherein the instructions, when executed, further cause:
granting a permission, to transmit data, to an upload of the plurality of scheduled uploads; and
monitoring traffic levels on a network after granting the permission to transmit data.

* * * * *

UNITED STATES PATENT AND TRADEMARK OFFICE
CERTIFICATE OF CORRECTION

| | | |
|---|---|---|
| PATENT NO. | : 10,880,226 B2 | Page 1 of 1 |
| APPLICATION NO. | : 16/249022 | |
| DATED | : December 29, 2020 | |
| INVENTOR(S) | : Wolcott et al. | |

It is certified that error appears in the above-identified patent and that said Letters Patent is hereby corrected as shown below:

In the Claims

Column 19, Claim 9, Line 31:
After "apparatus", insert --;--

Signed and Sealed this
Fifth Day of April, 2022

Drew Hirshfeld
*Performing the Functions and Duties of the*
*Under Secretary of Commerce for Intellectual Property and*
*Director of the United States Patent and Trademark Office*